United States Patent
Hutter et al.

(10) Patent No.: US 12,340,664 B2
(45) Date of Patent: Jun. 24, 2025

(54) METHOD OF FACILITATING A USER'S ACTION AT A TERMINAL AND SYSTEM THEREOF

(71) Applicant: Playtech Software Limited, London (GB)

(72) Inventors: Markus Hutter, Vienna (AT); Andreas Hutter, Baden (AT); Georg Schinagl, Eichgraben (AT)

(73) Assignee: PLAYTECH SOFTWARE LIMITED, London (GB)

( * ) Notice: Subject to any disclaimer, the term of this patent is extended or adjusted under 35 U.S.C. 154(b) by 0 days.

(21) Appl. No.: 17/556,646

(22) Filed: Dec. 20, 2021

(65) Prior Publication Data

US 2023/0196883 A1     Jun. 22, 2023

(51) Int. Cl.
| | |
|---|---|
| *G07F 17/32* | (2006.01) |
| *G06Q 50/34* | (2012.01) |
| *H04W 4/021* | (2018.01) |
| *H04W 4/80* | (2018.01) |

(52) U.S. Cl.
CPC ......... *G07F 17/3288* (2013.01); *G06Q 50/34* (2013.01); *G07F 17/3223* (2013.01); *H04W 4/021* (2013.01); *H04W 4/80* (2018.02)

(58) Field of Classification Search
CPC . G07F 17/3288; G07F 17/3223; G06Q 50/34; H04W 4/021; H04W 4/80
See application file for complete search history.

(56) References Cited

U.S. PATENT DOCUMENTS

| | | | |
|---|---|---|---|
| 2008/0113802 A1* | 5/2008 | Johnson | G07F 17/3227 463/40 |
| 2014/0200065 A1 | 7/2014 | Anderson et al. | |
| 2015/0228153 A1 | 8/2015 | Hedrick et al. | |
| 2017/0092076 A1* | 3/2017 | Anderson | G07F 17/3246 |
| 2018/0089938 A1 | 3/2018 | Lutnick et al. | |
| 2020/0105099 A1* | 4/2020 | Colvin | G07F 17/3255 |
| 2020/0250924 A1 | 8/2020 | Wyllie et al. | |

* cited by examiner

*Primary Examiner* — Kevin Y Kim
(74) *Attorney, Agent, or Firm* — FISHERBROYLES, LLP; Roger L. Browdy; Ronni S. Jillions

(57) ABSTRACT

A computerized method for facilitating a user's action at a terminal at a terminal location is provided. The method comprising: receiving a request from the user device to perform an action including any one of: collecting winnings derived from a placed bet and placing a bet; receiving from a computer device located at the terminal location, data indicative of a user device's location; determining if the user's device location and the terminal location meet a sufficiently close criterion indicative of an close distance of the user from the terminal, and if in the affirmative, granting the request; thereby enabling the user to collect the winnings or place the bet, only when located within the close distance to the terminal.

19 Claims, 4 Drawing Sheets

METHOD OF FACILITATING A USER'S ACTION AT A TERMINAL AND SYSTEM THEREOF

TECHNICAL FIELD

The presently disclosed subject matter relates to computerized gaming systems and more particularly, to facilitating a user's action pertaining to a bet in an event, where the action is completed in a physical terminal.

BACKGROUND

In our days, gambling systems, in which players place bets on events such as games, grant the players with flexibility on how to place the bets. The traditional land-based manner involves a casino or a self-service kiosk enabling a player to place a bet at a physical kiosk, e.g. through a self-service kiosk or terminal or at a cashier. The player purchases a physical ticket that includes details of an event and a bet that pertains to the event, at a kiosk. Once the event or the stage in the event to which the bet relates to is resolved, if the player won the bet, the player goes to the kiosk or the cashier to collect their winnings. On the other side of the scale, the online computerized gambling systems enable a player to register to the system, and then to place bets pertains to events, online, anytime and anywhere the services are provided, and to collect any winnings directly into digital wallets or to the account.

Both in the traditional manner at the at the kiosk, as well as in the online gambling services, the player is required to identify himself by providing identifying details, either a physical ID to the cashier or identifying details when gambling online. While in the physical purchase, the identifying details are not uploaded or stored in any database or a gaming system, with online gambling, full details of the user are stored and monitored. As such, in the traditional manner, there is neither electronic communication or information that is provided to the player as to the status of the ticket, nor any action which can be taken by the player in an online manner. Any action that the player wishes to perform requires the player to approach a physical kiosk and perform the required action. On the other hand, the online gaming systems provide full flexibility as to the time in which actions can be taken out, without any requirement from the player to physically approach the kiosk.

It is therefore required to enable the player to keep anonymity, as possible, while providing the player flexibility in performing actions pertaining to bets in events without approaching the kiosk at the time of the action.

GENERAL DESCRIPTION

With an attempt to combine between the traditional land-based manner and the online services according to aspects of the presently disclosed subject matter, a gaming system is provided. One purpose of the gaming system is to enable the user to partially perform some actions, pertaining to bet in an event, when located far from a terminal, and perform some other actions or complete the actions only when located near a terminal, after verifying that the location of the user is indeed near the terminal. As such, the user can perform an action including collecting winnings derived from a placed bet or placing a bet only when located near a terminal. If such a request to perform such actions is received by the gaming system, before granting the request, the user's location can be verified by receiving from a computer device located at the terminal location data indicative of a user device's location. The gaming system can determine if the user's device location and the terminal location are close, by determining if the two devices meet a sufficiently close criterion indicative of a close distance of the user from the terminal. If the gaming system determines that in the affirmative, it can grant the request. Thereby, the gaming system enables the user to collect the winnings or place the bet, only when located within the close distance to the terminal. The above enables the user to keep anonymity as possible, by enabling the player to place the bet by purchasing a physical ticket and upload it, e.g. to a mobile app, so the player can receive updates on the status of the ticket, and optionally, perform some actions pertaining to the ticket, but on the other hand, to make sure that the actions including placing the bets themselves or collecting winnings are performed only when the player is near a physical terminal at a predefined location, where it is permitted. Enabling the player to perform some actions via a mobile app is advantageous since some jurisdictions do not allow mobile/online betting but only land based/retail betting is allowed. In this manner, the gaming system can comply with local regulatory and enable placing land based bets only while improving user experience during the lifespan of the event for which the user placed the bet.

According to aspects of the presently disclosed subject matter, a user using a user device wishes to place a bet. The user can approach a terminal or a kiosk, e.g. at a casino at a certain location, and purchase a ticket. The ticket includes details pertaining to a bet placed by the user, including the monetary amount of the bet and details of the event. The user can upload the ticket to a mobile app on his device. Once the ticket is uploaded, the physical ticket can be invalidated by the gaming system and the user can track the bet and the ticket's status using the mobile app and optionally, perform some actions pertaining to the ticket and the bet. Once the lifespan of the event ends, or a stage in the event to which the bet relates to is resolved, the user can approach the terminal to collect the winnings. In order to verify that the user performs some actions only when located in a terminal, the user's physical location can be verified by the gaming system when the user requests to perform the action. Only if the user's location is verified to be near the terminal, the user's request can be granted. Online tracking of a physical ticket which was physically purchased at a terminal, enables the user to stay anonymous without registering to online services on one hand, while enjoying the access to information as to the status of the ticket at any time and place, and the flexibility in performing some actions, without physically going to the terminal.

In a similar manner, gaming system can enable a user to prepare in advance a bet pertaining to an event, when the user is located far from a terminal, e.g. at his home. The user's prepared in advance bet can be received by the gaming system, and can be accepted without granting the request to place the bet. Later, when the user is near the terminal, the user can request to confirm placement of the prepared in advance bet. The gaming system can verify the user's location and grant the request if the user's location is determined to be near a terminal. Enabling the user to prepare an in advance bet, and enable the user to merely go to the terminal to place the bet, after verifying that the user's location is indeed near a terminal when placing the bet, improves user experience e.g. by enabling the user flexibility in preparing the bet in a mobile app, while keeping anonymity when placing the bet itself. Also, once the bet is placed, it is less likely to loose a phone than the traditional piece of paper with the placed bet, such that the user's experience in the gambling improves. In addition, from system's end, it enables the gaming system to comply with local regulatory. It should be noted that the gaming system may deny the user's bet when the user approaches the terminal and wish to place the bet that was prepared in advance. This may be caused since long time has passed between the time that the user prepared the in advance bet and the time he approached the terminal, resulting in a bet terms which could not be valid any more by the gaming system.

According to one aspect of the presently disclosed subject matter there is provided a computerized method for facilitating a user's action at a terminal at a terminal location, the method comprising:

receiving from a user device operated by a user data identifying a ticket associated with a placed bet;

receiving a request from the user device to perform an action including collecting winnings derived from the placed bet;

receiving from a computerized device located at the terminal location, data indicative of a user device's location;

determining if the user's device location and the terminal location meet a sufficiently close criterion indicative of close distance of the user to the terminal, and if in the affirmative, granting the request;

thereby enabling the user to collect the winnings only when located within the close distance to the terminal.

According to another aspect of the presently disclosed subject matter there is provided a computerized method for facilitating a user's action at a terminal at a terminal location, the method comprising:

receiving a request from the user device to perform an action including any one of: collecting winnings derived from a placed bet and placing a bet;

receiving from a computer device located at the terminal location, data indicative of a user device's location;

determining if the user's device location and the terminal location meet a sufficiently close criterion indicative of an close distance of the user from the terminal, and if in the affirmative, granting the request;

thereby enabling the user to collect the winnings or place the bet, only when located within the close distance to the terminal.

In addition to the above features, the system according to above two aspects of the presently disclosed subject matter can comprise one or more of features (i) to (ix) listed below, in any desired combination or permutation which is technically possible:

(i). The data indicative of a user device's location including a location verification communication indicative that a location identifier device located at the terminal location is able to communicate with the user device with a short-range signal; and based on the received location verification communication, determining that the user's device location and the terminal location meet the sufficiently close criterion;

(ii). The computerized device is the location identifier device;

(iii). The computerized device is the user device;

(iv). The computerized device is the user device, and the data indicative of the user device's location including data indicative of an activation code, wherein the activation code is visible at the terminal location; and based on the received activation code, determining that the user's device location and the terminal location meet the sufficiently close criterion.

(v). The user device is not permanently attached to the terminal.

(vi). The terminal is a portable device configured to operate in a predefined terminal location.

(vii). The terminal is one of a plurality of terminals, each of the plurality of terminals is configured to operate in the predefined terminal location, wherein determining if the user's device location and the terminal location meet the sufficiently close criterion comprising determining if the user's device location and one or more of the terminal locations of the plurality of terminals meet the sufficiently close criterion.

(viii). The bet was placed by purchasing the ticket, the method further comprising:

providing information pertaining to the placed bet; and based on the provided information, receiving the request to perform an action.

(ix). The request to perform the action including a request for early collecting, indicative that the user's device location and the terminal location do not meet the sufficiently close criterion, the method further comprising:

accepting the request;

in response to receipt of a location trigger, receiving data indicative of a user device's current location;

determining that the current location and the terminal location meet the sufficiently close criterion; and granting the request.

According to yet another aspect of the presently disclosed subject matter there is provided a computerized gaming system for facilitating a user's action at a terminal in at terminal location, the system comprising:

a processing and memory circuitry (PMC);

wherein the PMC is configured, by a processor of the PMC, to:

operatively communicate with one or more terminals, wherein each terminal operates in a predefined terminal location;

receive from a user device operated by a user data identifying a ticket associated with a placed bet;

receive a request from the user device to perform an action including collecting winnings derived from the placed bet;

receive from a computerized device located at the terminal location, data indicative of a user device's location;

determine if the user's device location and the terminal location meet a sufficiently close criterion indicative of close distance of the user to the terminal, and if in the affirmative, grant the request;

thereby enabling the user to collect the winnings only when located within the close distance to the terminal.

According to another aspect of the presently disclosed subject matter there is provided a non-transitory computer readable storage medium tangibly embodying a program of instructions that, when executed by a computer, cause the computer to perform a method for facilitating a user's action at a terminal in a terminal location, the method comprising:

receiving from a user device operated by a user data identifying a ticket associated with a placed bet;

receiving a request from the user device to perform an action including collecting winnings derived from the placed bet;

receiving from a computerized device located at the terminal location, data indicative of a user device's location;

determining if the user's device location and the terminal location meet a sufficiently close criterion indicative of close distance of the user to the terminal, and if in the affirmative, granting the request;

thereby enabling the user to collect the winnings only when located within the close distance to the terminal.

The system and the computer program product disclosed in accordance with the aspects of the presently disclosed subject matter detailed above can optionally comprise one or more of features (i) to (ix) listed above with respect to the method, mutatis mutandis, in any technically possible combination or permutation.

According to another aspect of the presently disclosed subject matter there is provided a computerized method for facilitating a user's action at a terminal in at terminal location, the method comprising:

receiving from a user device operated by a user, a request to place a bet;

determining if the user's device location and the terminal location meet a sufficiently close criterion indicative of close distance of the user to the terminal;

if in the affirmative, granting the request; and if in the negative, postponing the request;

in response to receipt of a location trigger, receiving data indicative of a user device's current location; and determining that the current location and the terminal location meet the sufficiently close criterion and granting the request, thereby enabling the user to place the bet only when located within the close distance to the terminal.

According to another aspect of the presently disclosed subject matter there is provided in a user device operated by a user, a computerized method for facilitating a user's action at a terminal at a terminal location, the method comprising:

obtaining data identifying of a ticket associated with a placed bet;

transmitting to a gaming system the obtained data;

transmitting to the gaming system a request to perform an action including collecting winnings derived from the placed bet;

when located at the terminal location, transmitting to the gaming system data indicative of a location of the user device; and in response to the user's device location and a terminal location operatively communicating with the gaming system, meet a sufficiently close criterion, indicative of close distance of the user to the terminal, receiving a grant of the request, thereby enabling the user to collect the winnings when located within the close distance to the terminal.

The method disclosed in accordance with this aspect of the presently disclosed subject matter can optionally comprise one or more of features (i) to (ix) listed above with respect to the method, mutatis mutandis, in any technically possible combination or permutation. In addition to the above features, the computerized method according to this aspect of the presently disclosed subject matter can comprise one or more of features (x) to (xiii) listed below, in any desired combination or permutation which is technically possible:

(x). Transmitting the data indicative of the user device's location further comprising transmitting a location verification communication indicative that the user device is able to communicate, with a short-range signal, with a location identifier device, located at the terminal location; and based on the transmitted location verification communication, receiving the grant of the request.

(xi). The location verification communication includes an ID of the location identifier device.

(xii). Obtaining the data identifying the ticket further comprising storing data identifying the ticket on the user device; and transmitting to the gaming system the stored data.

(xiii). the ticket is one ticket of a plurality of tickets for which data is obtained and transmitted, the method further comprising:

obtaining data identifying of a plurality of tickets, each of the tickets is associated with a respective placed bet; and transmitting to the gaming system the obtained data.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "receiving", "transmitting", "sending", "obtaining", "determining", "granting", "facilitating", "indicating", "providing", "postponing", "enabling", "communicating", "processing", "displaying", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the gaming system 110 disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

According to certain embodiments of the presently disclosed subject matter, there is provided a gaming system that enables a user to track, in a mobile application, or a dedicated website, bets placed by physically purchased tickets and to perform several actions pertaining to the placed bets, while ensuring that some actions, such as collecting the winnings, are performed only when the user is near a terminal at a predefined location.

Figure 1:
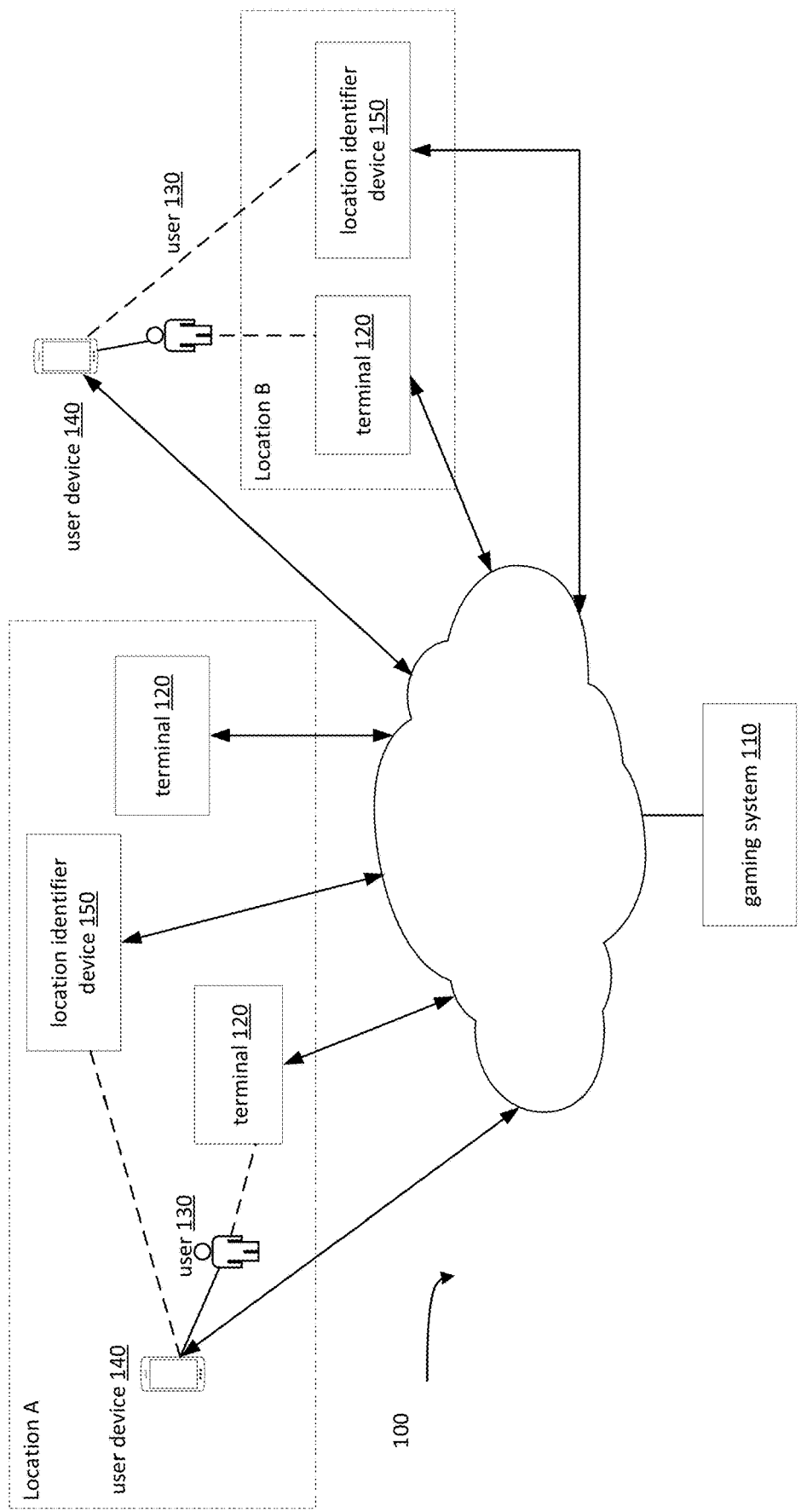
FIG. 1 illustrates a generalized diagram of a computerized gaming environment 100 in accordance with certain embodiments of the currently presented subject matter.

Bearing this in mind, attention is drawn to FIG. 1 illustrating a generalized diagram of a computerized gaming environment 100 in accordance with certain embodiments of the currently presented subject matter. The computerized gaming environment 100 comprises a gaming system 110 configured to manage tickets that pertain to bets that were placed, including providing data to players on the status of the tickets, the events, receiving and granting requests pertains to bets, etc.

The gaming system 110 is operatively connected to one or more terminals 120. A terminal 120 can be a self-service stationary or portable gaming terminal or a kiosk, as known in the art. Each terminal 120 can be located at a certain location, e.g. a store or in a casino floor, and is configured to operate in a predefined terminal location.

In some examples, a plurality of terminals 120 can be located at the same location. Consider an example of a casino with two floors, where one or more terminals 120 operate in each floor. As illustrated in FIG. 1, gaming system 110 is operatively connected to two terminals 120 which are located at location A and to one terminal 120 that is located at location B.

A user 130 (also referred to herein and below as a "player") can purchase a ticket using the terminal 120. The ticket pertains to one or more events, such as games, and includes a respective bet or bets on each of the events. The user 130 can upload the purchased ticket to a mobile app, using e.g. user device 140. User device 140 can be any computerized device operated by user 130, e.g. his mobile device. In some examples, the user device 140 is not permanently attached to the terminal 120. As illustrated in FIG. 1, gaming system 110 is operatively connected to one or more user devices 140 and can receive from the user device 140 data identifying a ticket purchased by the user 130, after the user uploaded the ticket to the mobile app. The user 130 can now track the ticket, by viewing information received from gaming system 110 such as the status of the ticket and other ticket details. If the user 130 won the bet in the event, the user 130 can approach the terminal 120 and collect at the terminal 120 any winnings that pertains to the bet in the ticket. For example, gaming system 110 can transfer the winnings to the terminal 120 that the user 130 approaches, and the user 130 can collect the winnings, or can transfer them into his digital wallet or bank account. In cases where the gaming system 110 is operatively connected to multiple terminals 120, the user 130 can approach each of the terminals 120 to purchase a ticket, and then to the same or different terminal 120, in the same or different location, to collect the winnings.

In order to verify that the user 130 cashes out the winnings only when located near the terminal 120 at a certain location, the gaming system 110 is further operatively connected to one or more location identifier device 150. The location identifier device 150 can be installed at a terminal location A or B, e.g. near a terminal 120, can be installed in the terminal 120 or can be a component of terminal 120. If the location identifier device 150 includes a display, then the location identifier device 150 is installed at the terminal location in a manner which is visible to the user 130. In some examples, location identifier device 150 is configured to assist in identifying the location of the user 130, e.g. by assisting to identify the location of the user device 140. In some examples, the location identifier device 150, located near the terminal 120, is configured to communicate with user device 140 in a short-range signal. The establishment of the short-range signal communication between the location identifier device 150 and the user device 140 is indicative of close distance of the user device 140 and the user 130 himself to the terminal 120. For example, the location identifier device 150 can be a beacon device operating beacon technology. Other technologies that can be operated by the location identifier device 150 can include BLE, Zigbee, Z-Wave. It is therefore advantageous to use a short-range technology, such that, if communication with the user device 140 is enabled, it is indicative that the user device 140 is physically located at the terminal location, when sending the request to perform an action to the gaming system 110. Data indicative of the short-range communication and the close distance of the user 130 to the terminal 120 can be sent to gaming system 110, in response to which, gaming system 110 can determine if the user's device 140 location and the terminal location A or B meet a sufficiently close criterion, indicative of close distance of the user to the terminal. If the criterion is fulfilled, i.e. if the user device 140 is indeed near the location of the terminal, then gaming system 110 can grant the user's request, e.g. to collect the winnings at the terminal. Otherwise, the gaming system 110 can deny or postpone the user 130 request. Further details of identifying the user location and determining if the user device's location and the terminal location meet the sufficiently close criterion are described below with respect to FIG. 2.

In some examples, the location identifier device 150 can include a display. The display is configured to display a unique activation code. The display can be a static display with a static activation code, e.g. a barcode, number or a symbol printed on a paper, or a dynamic display with a variable activation code, e.g. a screen with a frequently changed code. The variable identifying code can be changed at predefined times, e.g. every 60 seconds, 30 minutes, or once a day. For example, a screen with a variable barcode can be positioned near the entrance of the casino floor. The user 130 can input the unique activation code displayed on the display of the location identifier device 150 in order to verify his location. For example, the user 130 may scan, using the user device 140, the displayed barcode in a designated barcode scanner app, in the gaming mobile app, or in any app supporting QR code reading in the user device 140. In such examples, verifying the location of the user 130 can be done by sending data indicative of the activation code to gaming system 110. Since the location identifier device 150 including the display is near the terminal, at the terminal location, then receiving the activation code from the user device 140 is indicative that the user's device location and the terminal location meet the sufficiently close criterion when the user inputted the activation code.

Yet, in some examples, the location of the user's device can be verified using other known location technologies which can provide indication of location of a device with high accuracy, in a manner that enables the gaming system 110 to verify that the location of the user device 140 is near the terminal 120. For example, such location technologies can include DGPS technology providing location of accuracy of a few centimeters.

Figure 2:
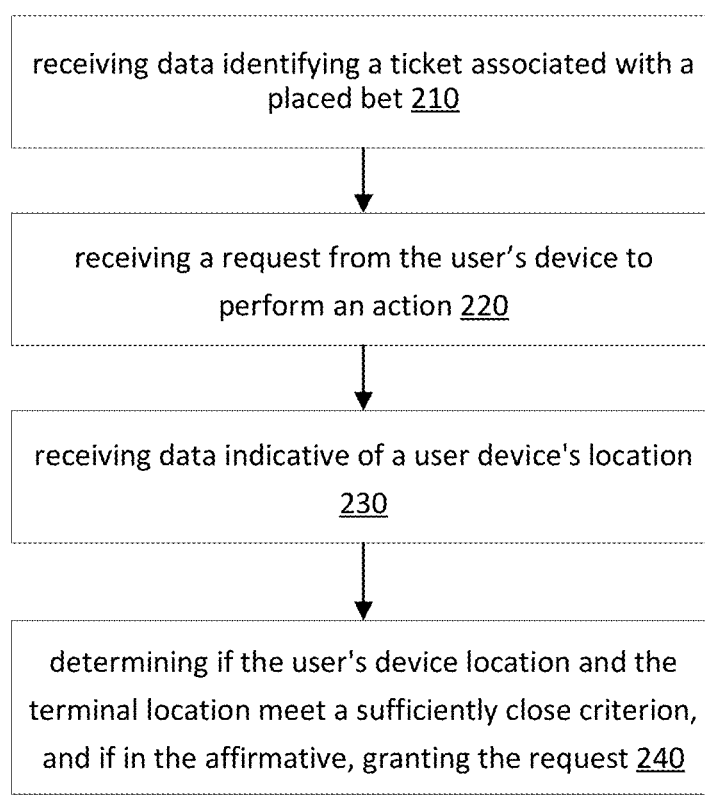
FIG. 2 illustrates a generalized flow-chart of operations performed by gaming system 110 in accordance with certain embodiments of the presently disclosed subject matter.

Referring to FIG. 2, there is illustrated a generalized flow chart of operations performed by gaming system 110 in accordance with certain embodiments of the presently disclosed subject matter. The following flowchart operations are described with reference to elements of gaming system 110.

Assuming an example of a user 130 who wishes to place a bet on a certain event. The user 130 may approach a terminal 120 at a certain casino and purchase a ticket. Each ticket has a unique ticket ID. In order to track the ticket's status e.g. in a mobile app or in a dedicated website, the user 130, using user device 140, can upload the ticket, such that the mobile app can obtain data identifying a ticket associated with a placed bet. For example, the user 130 can scan a barcode appearing on the ticket or can manually enter the ticket ID in the mobile app. Optionally, the obtained data, including data identifying the ticket can be stored on the user device 140. In cases where the user purchased a plurality of tickets, where each ticket is associated with a respective placed bet, the user 130 may upload the plurality of tickets, e.g. by scanning them. Any data of the ticket or the plurality of tickets obtained by the mobile app can be stored in the user device 140 and can be transmitted to the gaming system 110.

As soon as a bet is placed by the user 130 via a ticket, the gaming system 110 can receive from a user device 140 operated by a user 130 data identifying a ticket associated with the bet placed by the user 130 when purchased the ticket (block 210). In some examples, the gaming system 110 can receive data identifying more than one ticket. Once the purchased ticket was identified by the gaming system 110, the gaming system 110 can register the bet and ticket and optionally provide information pertaining to the placed bet to the user 130, e.g. though the mobile app. The placed bet is not just stored locally on the terminal 120. For example, the following details can be provided by gaming system 110 and be displayed to the user: status of the ticket (Open, Lost, Cashed Out, Won, etc.), ticket details (bet type, ticket ID, date & time, event(s) (with live score for in-play events), stake, estimated returns), Early Cash Out or Collect offer, if available, qualification for a Bonus feature. The user 130 can track the event and the ticket status and to request from gaming system 110 to perform one or more actions, based on the information provided to him.

Once the lifespan of the event ends, or a stage in the event to which the bet relates to is resolved, if the user 130 won the bet, the user 130 may go to a terminal 120 at a terminal location, e.g. in a store or a casino, to collect the winnings. The user 130 may transmit using the mobile device 140, using the mobile app, a request to the gaming system 110 to perform an action and, e.g. to collect winnings derived from the placed bet. The request may be sent while the user 130 is near the terminal 120. The gaming system 110 may receive the user's request to perform the action, including the collecting of the winnings derived from the bet placed in a ticket (block 220). The ticket may be identified by the gaming system 110 using the ticket ID.

In some cases, gaming system 110 may verify that the user's location is indeed near a terminal 120, at the terminal location, before granting the request. Verifying that the location of the user 130 is at the location of the terminal 120 is advantageous e.g. in order to enable completing the gambling action and collecting the winnings only when the user 130 is near a terminal, thereby complying with local regulatory in cases only land-based betting is allowed. As explained above with respect to FIG. 1, a location identifier device 150 may be installed at a terminal location, e.g. near or inside the terminal 120. Assuming the example of a casino, one or more terminals may be located at a casino floor, where the location of the terminals is the casino floor. One or more location identifier devices 150 may be installed near or inside each of the terminals, or a single location identifier device 150 may be installed at the casino floor. When user 130 approaches a terminal 120, at the terminal location, e.g. the casino floor, the location identifier device 150, may communicate with the user device 140 operated by user 130 in a short-range signal. For example, the location identifier device 150 can be a beacon device sending a short-range beacon signal which is received by the user device 140. The short-range signal sent to the user device 140 can include the ID of the location identifier device 150. Alternatively or additionally, the user device 140 may also send the user device's ID to the location identifier device 150. Sending the user device's ID without any additional user 130 assist in keeping anonymity of the user 130. Once communication is established between the location identifier device 150 and the user device 140, a computerized device, located at the terminal location, may transmit data indicative of the user device's location to the gaming system 110 (block 230). The computerized device can be any one of the user device 140, the terminal 120 or the location identifier device 150. Communication can be sent from one or more of these computerized devices. For example, the data indicative of the user device's location may include a location verification communication indicative that a location identifier device 150 located at the terminal location is able to communicate with the user device 140 with a short-range signal. The location verification communication may include the ID of the user device 140 and/or the ID of the location verification device 150. Since the location identifier device 150 is located at the terminal location and near or inside the terminal 120 itself, the establishment of the short-range signal communication between the location identifier device 150 and the user device 140 is indicative of close distance of the user device 140 and the user 130, to the terminal 120. If communication with the user device 140 is enabled, it is indicative to the gaming system 110 receiving the communication, that the user device 140 is physically located at the terminal location when communicating with the gaming system 110 and requesting to perform an action such as collecting winnings.

Based on the received location verification communication, gaming system 110 can determine whether the user's device location and the terminal location meet the sufficiently close criterion (block 240). For example, gaming system 110 may receive the location verification communication, optionally, with the ID of the location identifier device 150, compare the received ID with IDs of location identifier device 150 as stored in memory 230, and if there is a match, to determine that the user device 140 can communicate, using a short-range signal, with the location identifier device 150, such that the two devices meet a sufficiently close criterion. This being indicative of close distance of the user 130 to the terminal 120. In the example of a terminal 120 at a casino floor, then the user 130 may be inside the casino, e.g. at the casino's floor. If the terminal is inside a shop, then the user 130 may be inside the shop. In cases where the terminal 120 is one of a plurality of terminals 120, each of the plurality of terminals operating in the predefined terminal location, then the gaming system 110 can determine if the user's device location and the terminal location meet the sufficiently close criterion, by determining if the user's device location and one or more of the terminal locations of the plurality of terminals 120, meet the sufficiently close criterion.

For the sake of clarity, the term "sufficiently" may be used herein to imply the possibility of variations in values within an acceptable range. According to one example, the term "sufficiently" should be interpreted to imply possible variation of up to 3-5 metres, depending on beacon strength, over or under any specified value, in this case, the close criterion interpretation, as detailed above. For example, 'sufficiently close criterion' may include that the user 130 is located 5-8 meters from the location identifier device 150. In a similar manner, the location of the location identifier device 150 and the terminal 120 can be defined as "sufficiently" close to each other, where the location identifier device 150 is installed near or even inside the terminal 120. A person versed in the art would realize that other definition of a "sufficiently" close to each other may apply, which can assist the gaming system 110 to confirm that the user 130 is near the terminal, when sending the request to perform an action.

In some examples, the location identifier device 150 can include a display. The display may display a unique activation code, such as a number or a barcode. In such cases, the location identifier device 150 is installed at the terminal location in a manner which is visible to the user 130. The user 130, using the user device 140, can input the displayed activation code, e.g. by scanning the displayed barcode or manually inserting the displayed number. In order to verify the user's location, gaming system 110 can receive from the user device 140 the data indicative of the inputted activation code. Based on the received data, gaming system 110 can determine that the user's device location and the terminal location meet the sufficiently close criterion. For example, gaming system can compare the received activation code with a stored activation code associated with one or more terminals 120, and in case of a match, to determine that the location of the user 130 and the location of the terminal 120 meet the sufficiently close criterion.

Yet alternatively or additionally, the user device's location can be verified using other known positioning techniques such as DGPS technology providing location of accuracy of a few centimeters.

After the gaming system 110 determines that the user's device location and the terminal location meet the sufficiently close criterion, gaming system 110 can grant the user's request to perform an action. For example, gaming system 110 can send the user device communication indicative of a grant of the request. In addition, the gaming system 110 grant the user 130 to withdraw winnings from the terminal 120, or to place a new bet using the winnings from the event. In order to enable the user 130 to complete the action using the terminal 120, gaming system 110 can communicate with the terminal 120, and transmit authorization on the user's action, e.g. to enable the terminal 120 to accept a new bet, or to enable withdrawal of the winnings by the user 130. In cases where multiple terminals 120 operate in one location having a single location verification identifier 150, e.g. in the case of multiple stationary or mobile terminals 120 in a casino floor with a single location verification identifier 150, gaming system 110 can further receive from user device 140 data identifying a specific terminal 120 of the multiple terminals 120 for which the user 130 would like to perform the action. For example, user 130 can scan a barcode ID visible on the specific terminal 120 and send the scanned data to the gaming system 110 before, together with or after sending the request to perform an action. Granting the request only upon determining that the two locations meet the criterion, enables the gaming system 110 to confirm that the user 130 can perform the action including to collect the winnings, only when located within the close distance to the terminal 120.

In some examples, the user 130 tracking the ticket during the lifespan of the bet, by viewing details of the ticket and the bet through the mobile app, would like to perform an action pertaining to the ticket. For example, the user 130 would like to perform an early cash out, i.e. to settle the bet before the end of the event. In known systems, if the user 130 wishes to cash out, he has to approach a kiosk at the moment he wishes to cash out and perform there the action, irrespective of his ability, the time, and closeness to the terminal 120. According to the presently disclosed subject matter, the user 130 is able to partially perform an early cash out without approaching the terminal 120, and approach the terminal 120 at a later time, to complete the action and collect the winnings. In some examples, the user 130, while in a location which is not near the terminal, can send in the gaming app a request to perform an action including a request for early cashing out. The user's request for early cashing out is indicative that the user's device location and a terminal location do not meet the sufficiently close criterion. Otherwise, the user 130 would be able to cash out and collect the winnings at a specific terminal 120. Gaming system 110 can receive the user's request and partially grant the user's request. For example, upon receipt of the user's request, the gaming system 110 can accept and approve the request at the time it was request and according to the early cashing out terms offered to the user 130 at that point of time, but the gaming system 110 will not transfer the winnings derived from the early cashing out to any terminal 120 at that stage. Later, when the user 130 approaches a terminal 120, a location trigger can be sent to the gaming system 110, following which, the gaming system 110 can gran the user to complete his action at the terminal 120. For example, the location trigger can include an additional request from the user 130 to collect winnings when he is at the terminal location. The location trigger can also include a location verification communication sent from a computerized device located at a terminal location. The location trigger is indicative of a current user's location, e.g. that the user 130 is now near the terminal 120. In response to the gaming 110 receiving a location trigger, indicative of a user device's current location, gaming system 110 can determine if the user device's current location and the terminal location meet the sufficiently close criterion, in a similar manner described above. If the gaming system 110 determines that the current location of the user device 140 is near the terminal location, the gaming system 110 can grant the request, and enable the user 130 to collect winnings derived from the bet according to the early cash out terms, from the terminal 120. For example, the gaming system 110 can complete the action by authorizing the terminal 120 to allow the operator 130 to collect the winnings.

In some cases, the user 130 wishes to prepare a bet in advance, when e.g. located at home and not near the terminal 120, and only to approach the terminal 120 to place the bet, and, optionally, later, to approach the terminal 120 to collect any winnings. In such cases, the gaming system 110 can receive from the user device 140 operated by the user 130, a request to place a bet. In a similar manner to that described above, e.g. with respect to blocks 220-240 in FIG. 2, gaming system 110 can determine if the user's device location and the terminal location meet a sufficiently close criterion indicative of close distance of the user 130 to the terminal 120. For example, if gaming system 110 receives also from a computerized device located at the terminal location, data indicative of a user device's location, the gaming system 110 can determine that the user device's location is near the terminal location, if, based on the received data indicative of the location, the two devices' locations meet the sufficiently close criterion. In such examples, the gaming system 110 can grant the request to place a bet. On the other hand, if, based on the received data indicative of a user device's location the two devices do not meet the sufficiently close criterion, or that the user's request to place a bet is received without any additional receipt of data indicative of the user device's location, then the gaming system 110 can determine to the negative, and not to grant the request, but to postpone it.

Later, when the user 130 approaches the terminal 120, a location trigger can be sent to the gaming 110. For example, the location trigger can include an additional request from the user 130 to place the bet when he is at the terminal location. The location trigger can also include a location verification communication sent from a computerized device located at a terminal location. The location trigger is indicative of a current user's location, e.g. that the user 130 is now near a terminal 120. In response to the gaming 110 receiving a location trigger, indicative of a user device's current location, gaming system 110 can determine if the user device's current location and the terminal location meet the sufficiently close criterion. If, the gaming system 110 determines that the current location of the user device 140 is near a terminal 120, the gaming system can grant the request to place a bet. Granting the request to place a bet only after verifying his location and determining that the user 130 is indeed near the terminal 120, enables the gaming system 110 to verify that bets are placed only when users are located within the close distance to the terminal 120, and not remotely such as in online gambling.

It is noted that the teachings of the presently disclosed subject matter are not bound by the flow chart illustrated in FIG. 2. The illustrated operations can occur out of the illustrated order. For example, operations 210, 220 and 230 shown in succession can be executed substantially concurrently or in the reverse order.

Figure 3:
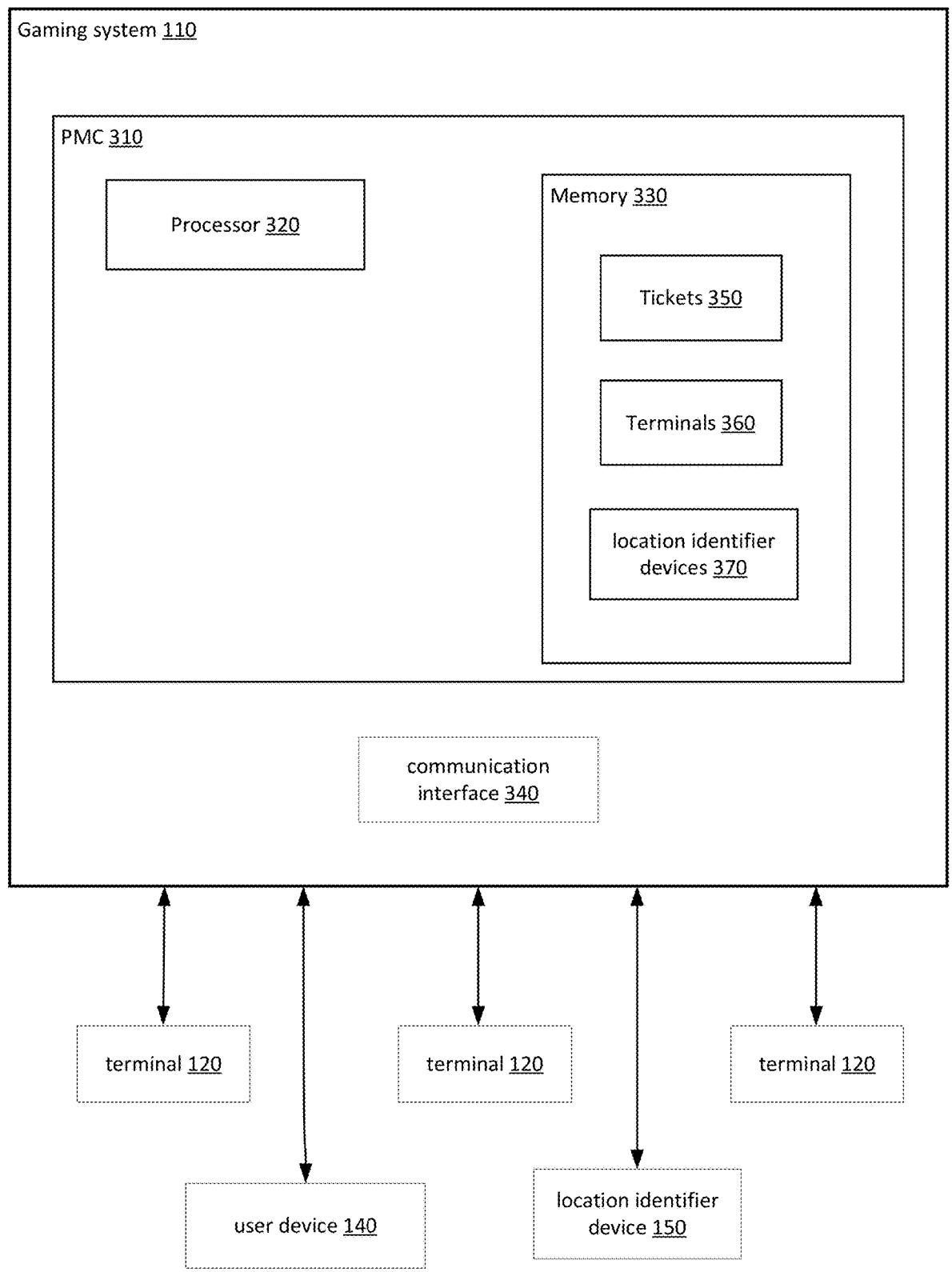
FIG. 3 illustrates a functional block diagram of elements of computerized gaming system 110, in accordance with certain embodiments of the presently disclosed subject matter.

Reference is now made to FIG. 3 illustrating a functional block diagram of gaming system 110. The illustrated gaming system 110 includes a processor and memory circuitry (PMC) 310 comprises a processor 320 and a memory 330. The processor 320 is configured to execute several functional modules in accordance with computer-readable instructions implemented on a non-transitory computer-readable storage medium. Such functional modules are referred to hereinafter as comprised in the processor 320.

Gaming system 110 can also comprise a communication interface 340 enabling the gaming system 110 to communicate via a network with external devices, such as one or more user devices 140, one or more terminals 120 and one or more location identifier device 150.

In some examples, processor 320, is configured to operate and execute stages described above with respect to FIG. 2, including the stages in blocks 210-240. For example, processor 320 is configured to facilitate a user's 130 action at a terminal 120 in at terminal location. Processor 320 is configured to operatively communicate with one or more terminals 120. After the user 130 purchased a ticket, he may upload the ticket into the mobile app. Processor 320 may receive from a user device 140 operated by a user 130 data identifying the ticket and the associated placed bet in the ticket. Processor 320 is further configured to receive from a user device 140 a request to perform an action. For example, the user may wish to collect winnings derived from the placed bet of the ticket such as his winnings, or to place a bet. In order to verify the user's location, processor 320 is configured to receive from a computerized device located at the terminal location, data indicative of a user device's location. Receiving the data indicative of a user device's location can be done in the manner described above, e.g. using the location identifier device 150 at the terminal location. Processor 320 is configured to determine if the user's device location and the terminal location meet a sufficiently close criterion indicative of close distance of the user 130 to the terminal 120, and if in the affirmative, to grant the request. Thereby, processor 320 is configured to enable the user 130 to collect the winnings only when located within the close distance to the terminal 120.

In these examples, where the user 130 wish to prepare in advance bet at the mobile app, or to early cash out, when located far from the terminal 120, processor 320 can receive a user's request to perform an action. The request can include a request for early cashing out or a request to place a bet. Processor 320 can determine if the user's device location and the terminal location meet the sufficiently close criterion, as detailed above. Processor 320 can accept the request for early cashing out but not grant authorization to collect winnings at the terminal 120, or can postpone the request to place a bet.

Processor 320 can confirm if a location verification communication is received from a computerized device located at the terminal location. If no communication is received, then processor 320 can determine that the sufficiently close criterion is not met. When the user 130 later approaches a terminal 120 processor 320 can receive a location trigger and determine if the two locations, the current user device's location and the terminal location, now meet the sufficiently close criterion. If in the affirmative, to grant the request.

In some examples, memory 330 may store data pertains to tickets 350 including tickets pertaining to open bets that were placed, closed bets, and "Bet proposals" pertaining to bets that have been built (e.g. in advanced prepared by user 130, but has not yet been placed at a terminal 120), terminals 360 and location identifier devices 370.

Figure 4:
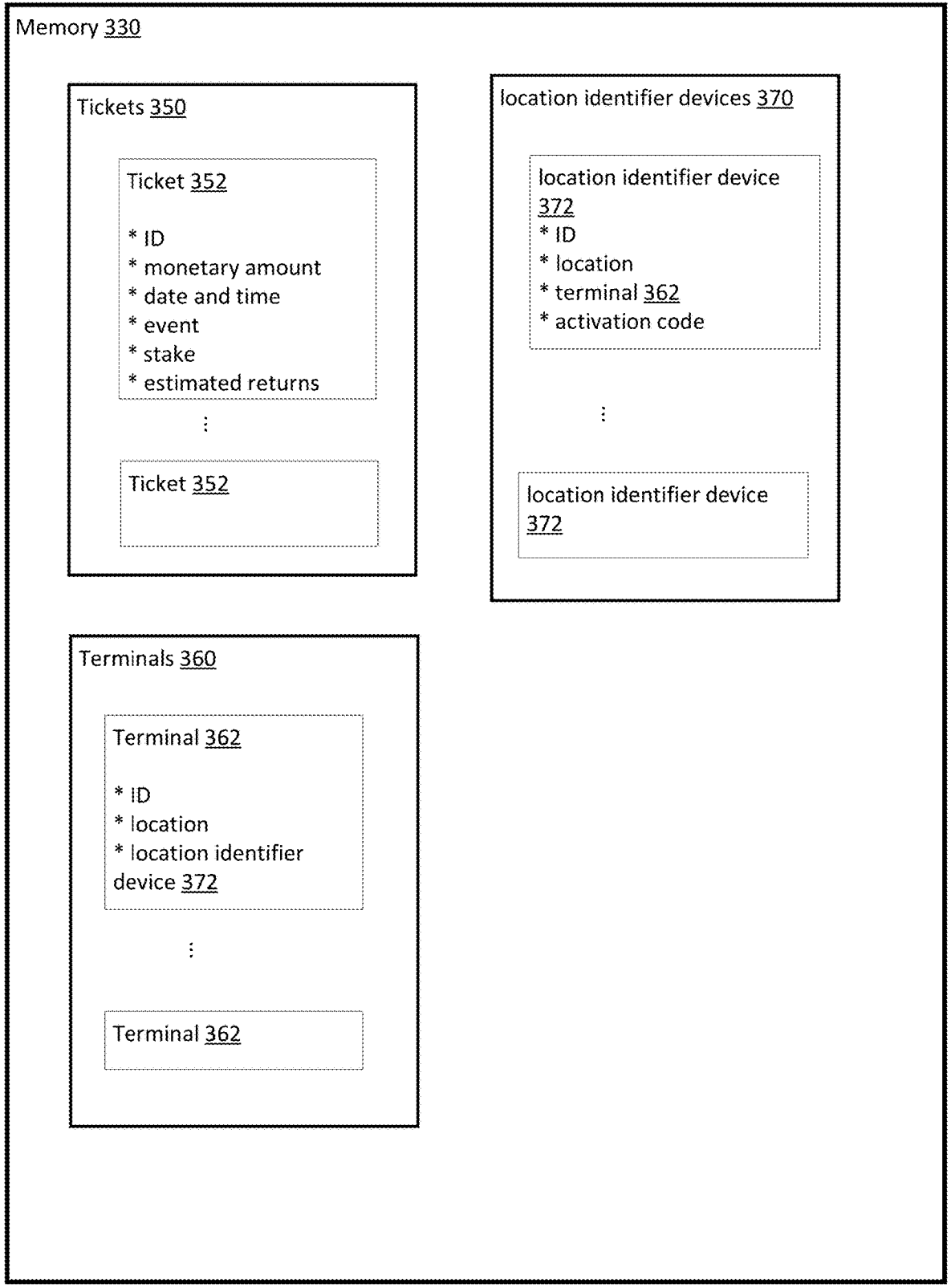
FIG. 4 illustrates an example of data stored in memory 230 in accordance with certain embodiments of the presently disclosed subject matter.

Reference is now made to FIG. 4 illustrating an example of data stored in memory 330 in accordance with certain embodiments of the presently disclosed subject matter.

In some examples, memory 330 may store data indicative of a plurality of tickets 350, such as tickets 352, each purchased by users 130. Each ticket 352 stored in memory 130 is associated with an ID that enables to uniquely identify the ticket, one or more bets placed by the tickets and their respective event, monetary amounts placed in the bet and other ticket details such as date and time is was purchased, stake, estimated returns and early cash out option, if such is enabled. The data may be updated according to the lifespan of the event. Ticket 352 may also pertain a bet proposal. In such examples, ticket 352 may include only some of the fields associated with ticket 352 pertaining to a placed bet, e.g. the bet proposal may include IS and monetary amount but not data and time. These fields may be updated later when the bet is placed at the terminal 120 and is registered by gaming system 110.

Memory 330 may also store data indicative of a plurality of terminals 360. Each stored terminal 362 may represent a physical terminal 120, as referred to above, and may store data pertains to the terminal 120, such as a terminal ID, to uniquely identify the specific terminal, location of the terminal 120, and optionally, the IDs of one or more associated location identifier device 150, from a plurality of location identifier devices stored in the memory 330 (described further below) The association of the location identifier device 150 to a stored terminal 362 may indicate that the terminal 120 and the associated location identifier device 150 are located at the same location, are near each other, and establishing communication of the associated location identifier device 150 with a user device 140 at a terminal location, is indicative that the user device 140 is close to the associated terminal 120. As such, that the user 130 can perform the action using the terminal 120.

Furthermore, memory 330 may also store data indicative of a plurality of location identifier devices 370. Each stored location identifier device 372 may represent a physical location identifier device 150 referred to above, and may be associated with a device ID, to uniquely identify the device, location of the device 150 and optionally, one or more associated terminals 120 and their IDs as stored in terminals 360. In a similar manner to the data stored in the terminal 362, the association of the location identifier device 150 to a terminal 120 may indicate that the terminal 120 and the associated location identifier device 150 are near each other, and establishing communication of an associated location identifier device 150 with a user device 140 at the terminal location is indicative that the user device 140 is close to the associated terminal 140, and the user 130 can perform the action using the associated terminal 120. In cases where the location identifier device 372 includes a display for displaying an activation code, location identifier device 372 can also be associated with an activation code.

Data stored in memory 330 may be used by gaming system 110 and processor 320 in managing tickets purchased by users 130 and in order to facilitating users' actions at terminals. For example, the stored data may be used to identify tickets that were purchased by users 130, when data identifying a ticket is received from a user device 140, to verify a user device's location when data indicative of user's device location is received, etc. In addition, the data stored in memory 330 may be updated as needed. Tickets 352 may be added or removed from tickets 350, or updating any other stored information pertaining to tickets 352 e.g. with the status of the event to which they were issued. In addition, terminals 362 and location identifier devices 372 may be added or removed from memory 330. In cases where the location identifier device 372 includes a display configured to display a variable activation code, a random activation code generator can be used to generate a variable activation code for location identifier device 372. Once generated, the activation code associated with a location identifier device 372 can be updated with the generated activation code. In addition, the generated activation code can be communicated to the location identifier device 150 at the terminal location, according to the respective ID of the location identifier device 150, such that it can be inputted by the user 130 at the terminal location.

It is noted that the teachings of the presently disclosed subject matter are not bound by the gaming system 110 described with reference to FIGS. 1, 3 and 4. Equivalent and/or modified functionality can be consolidated or divided in another manner and can be implemented in any appropriate combination of software with firmware and/or hardware and executed on a suitable device. Those skilled in the art will also readily appreciate that the data repositories such as memory 330 can be consolidated or divided in other manner; databases can be shared with other systems or be provided by other systems, including third party equipment.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A computerized method for facilitating a user's action at a terminal at a terminal location, the method comprising:
receiving from a user device, data identifying a physical ticket associated with a bet placed by an anonymous user, wherein the physical ticket is not associated with any pre-established user account, wherein the anonymous user is entitled to collect winnings derived from the bet;
receiving a request from the user device to perform an action including collecting the winnings;
receiving from a computerized device located at the terminal location, data indicative of a user device's location;
determining if the user's device location and the terminal location meet a sufficiently close criterion indicative of close distance of the anonymous user to the terminal, and if in the affirmative, granting the request;
thereby enabling the anonymous user to collect the winnings directly using the physical ticket and only when located within the close distance to the terminal.

2. The computerized method of claim 1, wherein the data indicative of a user device's location including a location verification communication indicative that a location identifier device located at the terminal location is able to communicate with the user device with a short-range signal; and
based on the received location verification communication, determining that the user's device location and the terminal location meet the sufficiently close criterion.

3. The computerized method of claim 2, wherein the computerized device is the location identifier device.

4. The computerized method of claim 2, wherein the computerized device is the user device.

5. The computerized method of claim 1, wherein the computerized device is the user device, and wherein the data indicative of the user device's location including data indicative of an activation code, wherein the activation code is visible at the terminal location; and
based on the received activation code, determining that the user's device location and the terminal location meet the sufficiently close criterion.

6. The computerized method of claim 2, wherein the user device is not permanently attached to the terminal.

7. The computerized method of claim 2, wherein the terminal is a portable device configured to operate in a predefined terminal location.

8. The computerized method of claim 1, wherein the terminal is one of a plurality of terminals, each of the plurality of terminals is configured to operate in the predefined terminal location, wherein determining if the user's device location and the terminal location meet the sufficiently close criterion comprising determining if the user's device location and one or more of the terminal locations of the plurality of terminals meet the sufficiently close criterion.

9. The computerized method of claim 1, wherein the bet was placed by purchasing the ticket, the method further comprising:
providing information pertaining to the placed bet; and
based on the provided information, receiving the request to perform an action.

10. The computerized method of claim 1, wherein the request to perform the action including a request for early cashing out, indicative that the user's device location and the terminal location do not meet the sufficiently close criterion, the method further comprising:
accepting the request;
in response to receipt of a location trigger, receiving data indicative of a user device's current location;
determining that the current location and the terminal location meet the sufficiently close criterion; and
granting the request.

11. A computerized method for facilitating a user's action at a terminal in at terminal location, the method comprising:
receiving from a user device operated by an anonymous user, a request to place a bet;
determining if the user device location and the terminal location meet a sufficiently close criterion indicative of close distance of the user to the terminal;
if in the affirmative, granting the request; and
if in the negative, postponing the request;
in response to receipt of a location trigger, receiving data indicative of a user device's current location; and
determining that the current location and the terminal location meet the sufficiently close criterion and granting the request,
thereby enabling the anonymous user to place the bet directly using an associated physical ticket, wherein the ticket is not associated with any pre-established user account, and only when located within the close distance to the terminal.

12. A computerized gaming system for facilitating a user's action at a terminal in at terminal location, the system comprising:
a processing and memory circuitry (PMC);
wherein the PMC is configured, by a processor of the PMC, to:
operatively communicate with one or more terminals, wherein each terminal operates in a predefined terminal location;
receive from a user device, data identifying a physical ticket associated with a bet placed by an anonymous user, wherein the physical ticket is not associated with any pre-established user account, wherein the anonymous user is entitled to:
receive a request from the user device to perform an action including collecting the winnings;
receive from a computerized device located at the terminal location, data indicative of a user device's location; and
determine if the user device location and the terminal location meet a sufficiently close criterion indicative of close distance of the anonymous user to the terminal, and if in the affirmative, grant the request;
thereby enabling the anonymous user to collect the winnings directly using the physical ticket and only when located within the close distance to the terminal.

13. A non-transitory computer readable storage medium tangibly embodying a program of instructions that, when executed by a computer, cause the computer to perform a method for facilitating a user's action at a terminal in a terminal location, the method comprising:
receiving from a user device operated by a user, data identifying a physical ticket associated with a bet placed by an anonymous user, wherein the physical ticket is not associated with any pre-established user account, wherein the anonymous user is entitled to collect winnings derived from the bet;
receiving a request from the user device to perform an action including collecting the winnings;
receiving from a computerized device located at the terminal location, data indicative of the user device location;
determining if the user device location and the terminal location meet a sufficiently close criterion indicative of close distance of the anonymous user to the terminal, and if in the affirmative, granting the request;
thereby enabling the anonymous user to collect the winnings directly using the physical ticket and only when located within the close distance to the terminal.

14. In a user device, a computerized method for facilitating a user's action at a terminal at a terminal location, the method comprising:
obtaining data identifying a physical ticket associated with a bet placed by an anonymous user, wherein the physical ticket is not associated with any pre-established user account, wherein the anonymous user is entitled to collect winnings derived from the bet;
transmitting to a gaming system the obtained data;
transmitting to the gaming system a request to perform an action including collecting the winnings;
when located at the terminal location, transmitting to the gaming system data indicative of a location of the user device; and
in response to the user device location and a terminal location operatively communicating with the gaming system, meet a sufficiently close criterion, indicative of close distance of the anonymous user to the terminal, receiving a grant of the request,
thereby enabling the anonymous user to collect the winnings directly using the physical ticket and only when located within the close distance to the terminal.

15. The method of claim 14, wherein transmitting the data indicative of the user device's location further comprising transmitting a location verification communication indicative that the user device is able to communicate, with a short-range signal, with a location identifier device, located at the terminal location; and
based on the transmitted location verification communication, receiving the grant of the request.

16. The method of claim 14, where the location verification communication includes an ID of the location identifier device.

17. The method of claim 14, wherein obtaining the data identifying the ticket further comprising storing data identifying the ticket on the user device; and transmitting to the gaming system the stored data.

18. The method of claim 17, wherein the ticket is one ticket of a plurality of tickets for which data is obtained and transmitted, the method further comprising:

obtaining data identifying a plurality of tickets, each of the tickets is associated with a respective placed bet; and transmitting to the gaming system the obtained data.

19. The method of claim 1, wherein prior to receiving the data identifying the ticket, uploading the ticket to a mobile app on the user device, thereby enabling the anonymous user to perform online tracking of the placed bet while keeping anonymity.

\* \* \* \* \*